US005361249A

United States Patent [19]

Monastra et al.

[11] Patent Number: 5,361,249
[45] Date of Patent: Nov. 1, 1994

[54] FAULT TOLERANT SWITCHED COMMUNICATION SYSTEM

[75] Inventors: Edward J. Monastra; Leon Trevito, both of Voorhees; Richard G. Branco, Westmont, all of N.J.

[73] Assignee: Martin Marietta Corp., Moorestown, N.J.

[21] Appl. No.: 140,993

[22] Filed: Oct. 26, 1993

[51] Int. Cl.⁵ ............................................. H04L 1/22
[52] U.S. Cl. ................................... 370/16; 370/65.5
[58] Field of Search ................... 370/13, 16, 60, 65.5; 340/826, 827; 371/8.1, 8.2, 10.1, 10.2

[56] References Cited

U.S. PATENT DOCUMENTS 3,603,736 9/1971 Morroll ............................. 370/16
4,536,870 8/1985 Bovo et al. ........................ 370/16

Primary Examiner—Douglas W. Olms
Assistant Examiner—Huy D. Vu
Attorney, Agent, or Firm—William H. Meise; C. A. Nieves; S. A. Young

[57] ABSTRACT

A fault tolerant communication arrangement, for switching parallel N-bit information among a plurality of stations, includes an M-bit crossbar switch, where M is greater than N by a number S of supernumerary or spare bit paths. At each station, an interface unit monitors for errors, and when an error is identified to a bit in the transmission path, routes the defective bit to one of the spare bit paths. All stations reroute data from the defective bit path to the same spare bit path. Error coding information is generated at the transmitting interface unit, and transmitted over some of the supernumerary bit paths, and when the number of defective bit paths reduces the number of available supernumerary bit paths to zero, the bit intensity of the error coding is reduced, to free additional supernumerary paths. In a system in which some of the stations include memory, a failure of a memory bit at a particular address is, in effect, a failure of that bit in an overall transmission path. A memory sparing map keeps track of defective locations, and routes bits to other, non-defective memory locations.

7 Claims, 9 Drawing Sheets

FAULT TOLERANT SWITCHED COMMUNICATION SYSTEM

FIELD OF THE INVENTION

This invention relates to fault tolerant arrangements for switched communications among a plurality of stations by means of parallel digital signals. More particularly, the invention relates to reliability improvement by the provision and control of redundant bit paths.

BACKGROUND OF THE INVENTION

It is often necessary to provide for information (data) communication amongst any pair of a plurality of transmit-receive stations. FIG. 1 illustrates, in simplified block diagram form, a communication system 10 including a plurality of transmit-receive (transducing) stations (ST) $12_1$, $12_2$, $12_3$ ... $12_K$, and another plurality of stations $14_1$, $14_2$, $14_3$ ... $14_L$, interconnected by (N+C)-bit data paths designated $13_1$, $13_2$ ... $13_K$, $15_1$, $15_2$ ... $15_L$ and by a crossbar switch 16. Crossbar switch 16 includes a set of K+L data ports, including a plurality K of ports, each of which is coupled by a data path $13_1$, $13_2$, ..., $13_K$ to one of stations $12_1$, $12_2$, ... $12_K$, respectively, and also including a further plurality L of ports, each of which is coupled by a data path $15_1$, $15_2$, ..., $15_L$ to one of stations $14_1$, $14_2$, ... $14_L$, respectively. As illustrated in FIG. 1, each data path 13, 15 includes a number N+C of parallel data paths, N of which carry digital signal bits of significance ranging from an least-significant bit (LSB) to a most-significant bit (MSB); one of the N data paths associated with each station carries the LSB, another of the N paths carries the MSB, and each of the other N bit paths carries bits of a particular significance lying between the LSB and MSB. The C bit paths are used for error Coding, such as for error detection and correction (EDAC) or parity coding. For example, station $12_1$ communicates through data path $13_1$, by means of an (N+C)-bit digital signal, including an LSB and an MSB, each of which is carried by a separate bit path (ordinarily one conductor wire) of the N portion of data path $13_1$, and carries error coding bits in the C portion of data path $13_1$. Similarly, station $14_1$ communicates by means of an N-bit digital signal and C error coding bits through data path $15_1$, which has (N+C) bit paths. It should be noted that some or many prior art communications systems may dispense with error coding, whereupon C=0, and communication system 10 of FIG. 1 becomes an N-bit system.

Crossbar switch 16 as illustrated in FIG. 1 includes a plurality 1, 2, 3 ... K "upper" ports connected to stations $12_1$, $12_2$, $12_3$ ... $12_K$, and includes a further plurality of "lower" ports 1, 2, 3 ... L, which are connected by way of data paths 15 to stations $14_1$, $14_2$, $14_3$ ... $14_L$. The separate designations should not be construed to mean that there is any difference among the ports. Thus, there is no necessary difference among any of the stations 12 and any of the stations 14, and they could all have easily been designated by a single reference numeral, such as 12, with a different set of subscripts. Similarly, there is no difference among any of the information ports of crossbar switch 16.

In some instances, it is customary to provide redundancy to avoid complete system failure in the event of failure of a single component or device. For example, in the arrangement of FIG. 1, if crossbar switch 16 became inoperative, as might occur in the absence of error coding if even one bit path of the N bit paths became open or shorted to ground in the switch or its interconnecting paths, or in the presence of error coding if a number of bit paths of the N bit paths, exceeding the number for which the error coding corrects, became inoperative, the entire communication system might become nonfunctional.

FIG. 2 illustrates an arrangement generally similar to FIG. 1, in which two crossbar switches, designated $16a$ and $16b$, are paralleled. In FIG. 2, elements corresponding to those of FIG. 1 are designated by like reference numerals. In FIG. 2, each output port of crossbar switch $16a$ is paralleled with the corresponding output port of the redundant crossbar switch $16b$. For example, data port 1 of the lower set of L ports of crossbar switch $16a$ is connected in parallel with data port 1 of the lower set of L ports of crossbar switch $16b$, as exemplified by data path $221_1{}^a$ which connects data port 1 of the upper set of ports of switch $16a$ to data path $15_1$, and a similar data path $221_1{}^b$ connecting data port 1 of the lower set of ports of switch $16b$ to data path $15_1$. In this context, the term "parallel" means that each bit path of data path $221_1{}^a$ is connected to the corresponding bit path of data path $221_1{}^b$. The arrangement illustrated in FIG. 2 provides redundancy of the crossbar switch, so that a failure of the switch, or of a portion thereof, may be overcome by use of the alternate or redundant crossbar switch.

The arrangement of FIG. 2 does, however, have some limitations in the level of achievable redundancy. The arrangement of FIG. 2 provides for redundancy of data paths such as data path $221_1{}^a$ and $221_1{}^b$, in that an open-circuit failure in one of the data paths can be overcome by switching to the redundant crossbar switch, which also switches the data path $22_1$. However, a short-circuit or inadvertent interconnection of one bit path of a data path to another bit path of the same data path, or to ground, cannot be corrected, as a result of the parallel connections of data path $221_1{}^a$ to $221_1{}^b$. Also, the arrangement of FIG. 2 by implication requires some means for detecting the existence of a failure associated with the crossbar switch. In the simplest situation, this might involve a human operator who observes the system and who, in response to an overt system problem such as a broken or failed bit or data path (wire or fiber-optic cable), or in response to inappropriate system behavior, controls the system so as to operate with the alternate crossbar switch. Faster and more reliable operation might be achieved with an automatic error detection system, for detecting the presence of errors by comparison of parity bits or the like. If such an error detection system were associated with one of switches $16a$ or $16b$ of FIG. 2, a single failure in the error detection system itself might result in an inability to switch in the presence of a failure in the data paths. The provision of an additional crossbar switch may not be the most cost-effective way to provide fault tolerance in such a system, and may also adversely affect system performance due to additional signal loading attributable to the parallel connections.

An improved multiple station communication system for parallel digital signals is desired.

SUMMARY OF THE INVENTION

A fault tolerant system for communicating among plural stations, each of which transduces (transmits and/or receives) N-bit parallel digital information signals, includes a switching system capable of switching M parallel bits, where M>N. Fault tolerance is provided by associating each N-bit station with a controllable or controlled interface unit or multiplexing scheme which interconnects the N-bit station with the M-bit switching system. The controlled interface unit associated with each station routes the N bits to be transmitted by a station over N operable bit paths of the M-bit switching system, bypassing any nontransmissive bit paths by use of one or more supernumerary (S), spare or extra M-N bit transmission paths of the switching system. In a receiving mode of the controlled interface unit associated with each station, those bit signals received from the switching system over supernumerary bit paths are controllably multiplexed by the controlled interface unit back to the bit paths of appropriate significance of the receiving station. In a particular embodiment of the invention, the switching arrangement is a crossbar switch. In an embodiment of the invention, EDAC error detection and correction is used under normal operating conditions, with the additional code bits required for the EDAC routed over a plurality of the spare, additional or supernumerary bit paths; when all of the supernumerary bit paths are in use for carrying bit data, due to defects in the main data paths, the occurrence of an additional defect switches operation from a more bit-intensive error coding to a less bit-intensive coding, as from EDAC to parity, thereby freeing additional ones of the supernumerary bit paths for carrying defective bits. The occurrence of further defects, over the number of additional defects in the main data-carrying paths which fully use the additional ones of the supernumerary bit paths freed by switching from EDAC to parity, is handled by further reducing the intensity of the coding or deleting error coding altogether, as by deleting parity coding, and using the supernumerary bit paths freed thereby to carry the further defective bit paths. The occurrence of further defects in the bit paths can be detected, after the EDAC and parity coding is eliminated, by the use of test transmissions.

In another embodiment, the system includes a memory made up of plural memory bank sections or pages, or interleaved memory structures, in which different pages may have defective memory locations at various different addresses, and in which the controlled interface units each include further memory, which is programmed to reset the state of the interface "column spare" multiplexers in response to the memory pages being addressed.

DESCRIPTION OF THE INVENTION

Figure 1:
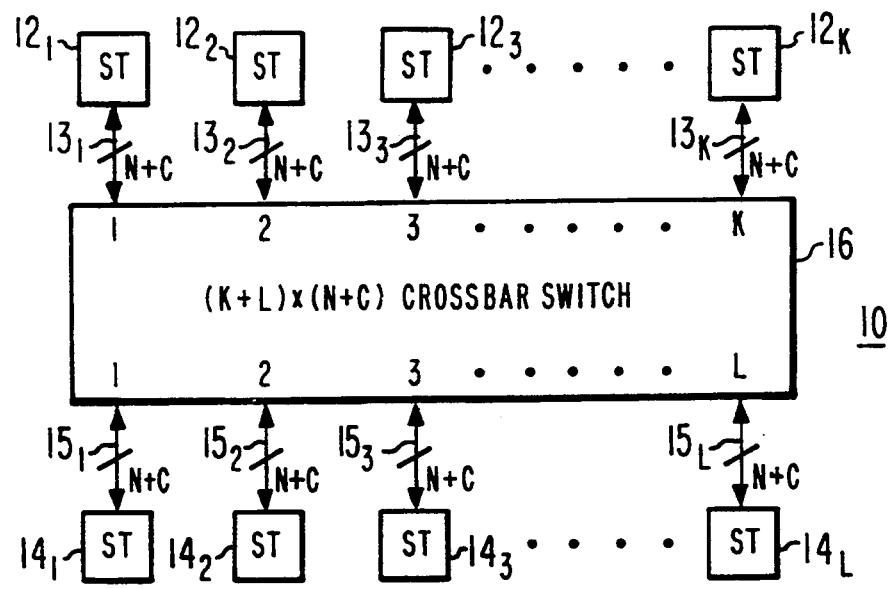
FIG. 1 is a simplified block diagram of an (N+C)-bit prior-art communication system including a plurality of transmit-receive stations interconnected by way of a crossbar switch.
Figure 2:
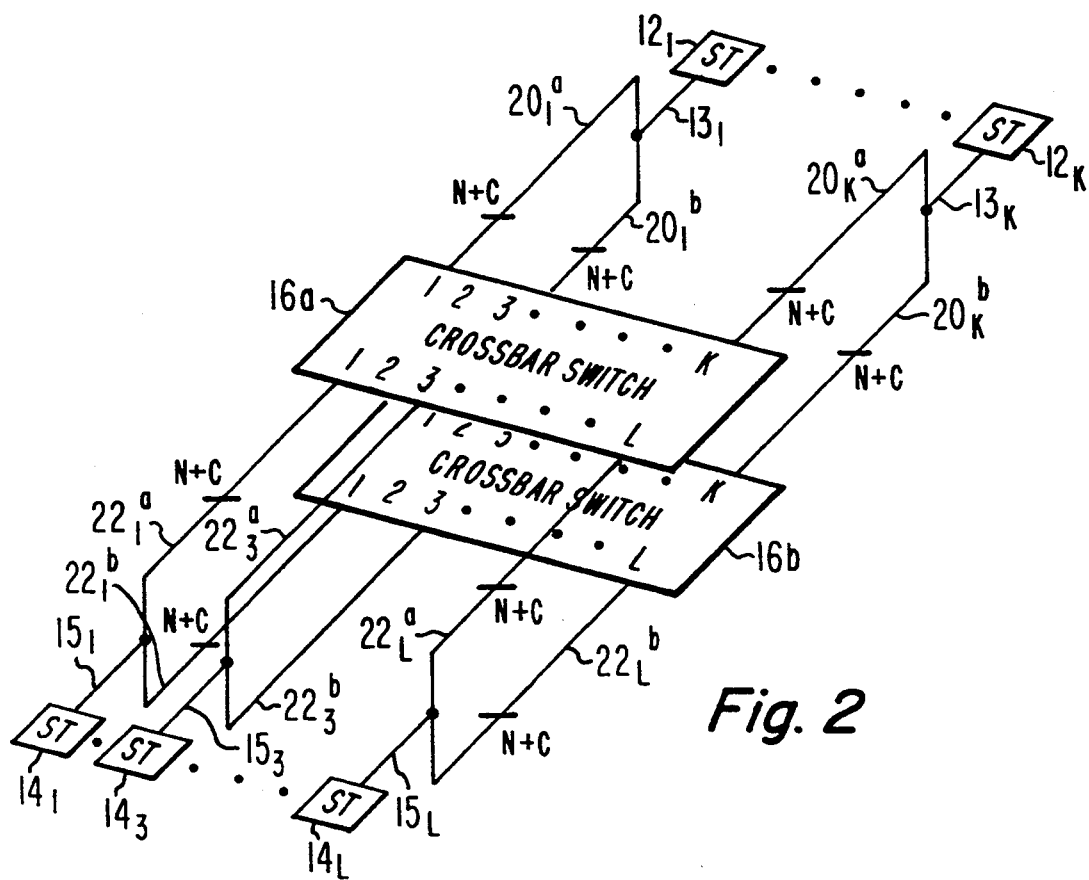
FIG. 2 is similar to FIG. 1, and includes a redundant crossbar switch paralleled with the first.
Figure 3:
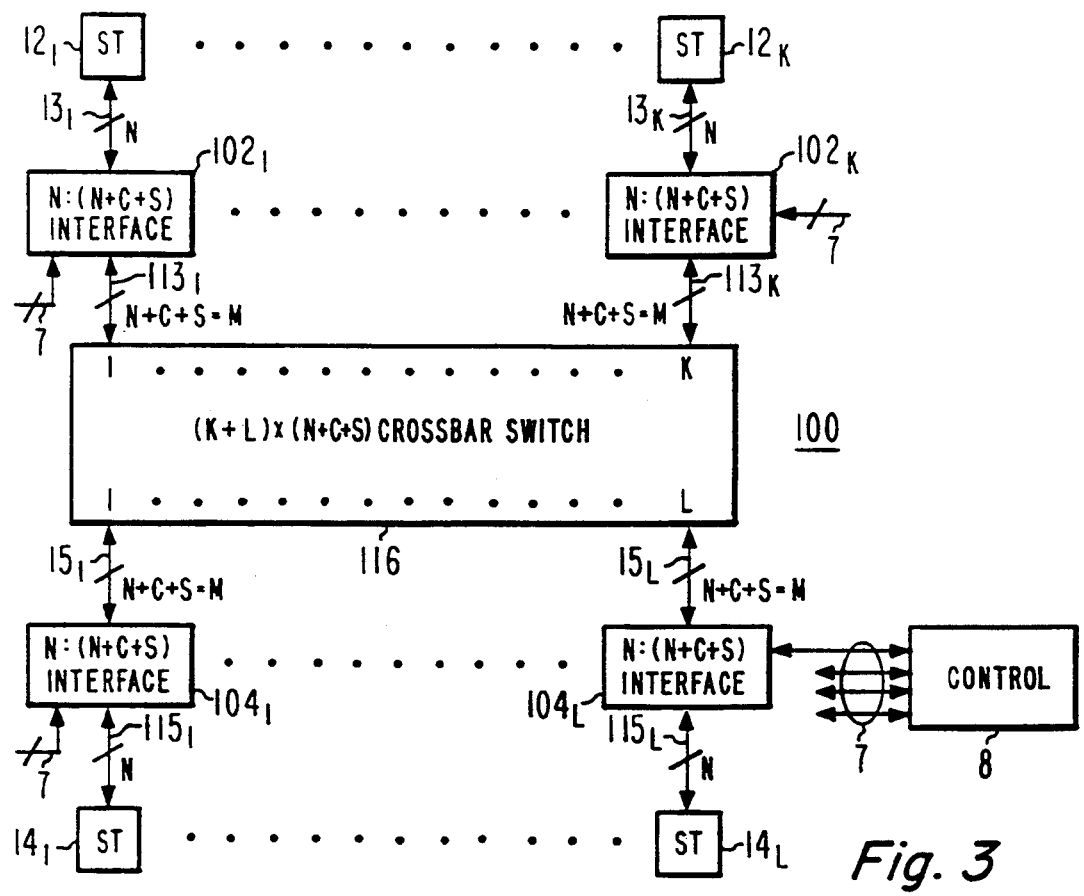
FIG. 3 is a simplified block diagram of a communication system according to the invention, including a plurality of N-bit stations and an M-bit crossbar switch, where M is greater than N, and including a controlled interface unit $102_X$ or $104_X$ associated with each station.

FIG. 3 is a simplified block diagram of a communications system 100 in accordance with an aspect of the invention. In FIG. 3, elements corresponding to those of FIG. 1 are designated by like reference numerals. In FIG. 3, the crossbar switch is designated 116 rather than 16 as in FIG. 1, because it differs from crossbar switch 16 of FIG. 1 by having additional supernumerary (S) bit paths over the (N+C) bit paths of switch 16. As illustrated in FIG. 3, crossbar switch 116 is capable of M-bit operation, where M>N. It should be understood that the M bits may include C additional overhead bits, such as error coding or parity bits. The number of spare or supernumerary bits might be considered to be S=M−(N+C), where the hyphen represents subtraction, or more simply M=N+C+S, but for reasons described below, the supernumerary bit paths may be considered to include the coding bit paths and true supernumerary paths, so that S=M−N, or S=C+$S_T$.

As a particular simple example, M might equal seventy-three, of which the actual data bits N might be sixty-four, the EDAC error coding bits might be eight, and the true supernumerary bits would in that case be one, meaning that the width M of the signal (as opposed to overhead or supernumerary bits) path is one bit greater than the minimum required to carry a 64-bit signal with eight-bit error coding, so that S=1. It should be understood that, in general, the reliability of the system will improve as the number of true supernumerary bits $S_T$ increases. A desirable number of true supernumerary bits for use with data bits N equal to sixty-four and error coding bits C equal to eight might be $S_T$ equal to twelve, whereby the total number of bits M would be eighty-four, of which twenty would be supernumerary bits.

In FIG. 3, an N:M controlled interface unit $102_X$ (where the subscript X represents any of the units) is associated with each station 12, where M=(N+C+$S_T$), and a similar controlled interface unit 104 is associated with each station 14. For example, a controlled interface unit $102_1$ is coupled by way of an (N+C+$S_T$)-bit data path $113_1$ to a port of crossbar switch 116, and is also coupled by way of a N-bit data path $13_1$ with station $12_1$. Similarly, a controlled interface unit $102_K$ is connected with a port of crossbar switch 16 by way of a (N+C+$S_T$)-bit data path $113_K$, and to a station $12_K$ by way of an N-bit path $13_K$. Controlled interface units $104_X$ are similarly connected by (N+C+$S_T$)-bit data paths $15_X$ to ports of switch 116, and by way of N-bit paths $115_X$ to corresponding stations $14_X$, where subscript X represents any one of the L stations 14. As described below, one or more of stations $12_X$ or $14_X$ may include RAM or ROM memory, which may represent one or more pages of global memory.

In operation of the arrangement of FIG. 3, a transmitting station 12 (or 14) produces N-bit signals to be transmitted to another station via the communication system, and applies those N bits to its corresponding controlled interface unit 102 or 104. For example, station $14_1$ may produce N data bits on data path $115_1$ for ultimate transmission to station $12_K$, and applies those N bits over data path $115_1$ to interface unit $104_1$. Interface unit $104_1$ is controlled, in conjunction with other similar interface units, by a control unit, processor or computer illustrated as a block 8. Control block 8, as further described below, is connected by a bus 7 to each of the controlled interface units $102_X$, $104_X$, and monitors the status of the transmission paths extending through the crossbar switch, including transmission paths such as path $15_1$ and $113_K$, to determine the existence of failures to transmit among the bit paths of the data path. Control block 8 operates by collecting error status from the error detection and correction (EDAC) or parity coding portions of the various interface units 102 and 104. If all $N+C+S_T$ bits of the transmission paths, including the path through switch 116, are operable, the N-bit signal applied from a station 12 or 14 to the associated controlled interface unit $102_X$ or $104_X$, respectively, is then applied over the N-bit portion of the (N+C+S) system bit path, whereby the $S_T$ supernumerary bit paths of the transmission path are unused.

In the event that one of the N data bit paths within the data path extending from interface unit $104_1$ of FIG. 3 to interface unit $102_K$ is determined by control block 8 to be not transmitting or to be nonfunctional, such as might occur in the event of an open-circuit condition of that particular bit path, or due to a malfunctioning (solid-state) switch contact, control unit 8 identifies the defective bit path to interface units $104_1$ and $102_K$. As described below, interface unit $104_1$ is then reconfigured, generally speaking, to couple the N data bits from the associated station 14 onto those of the $N+C+S_T$ data paths extending through data path $15_1$, switch 116 and data path $113_K$ as are operational. One way to accomplish this is to couple those data bits, which would otherwise be transmitted over the defective bit path or paths (which we may call "defective" data bits) onto the true supernumerary or extra $M-(N+C)$ data paths in data path $15_1$, switch 116 and data path $113_K$. For example, if the number of true supernumerary bits $M-N$ is twelve as suggested in the above example, the first of the twelve true supernumerary bit paths is selected to carry the defective bit. At the same time that the defective data bits are coupled onto the supernumerary data paths in controllable interface unit $104_1$, all other interface units, including unit $102_K$, are reconfigured in response to the information from control block 8 to accept the N bits from the bit paths extending through the communications path, corresponding to the bit paths selected by interface unit $104_1$. More particularly, the communication system carries the N−1 defective bits over the N regular bit paths, one of which is defective, and carries the defective bit over one of the $S_T$ bit paths. Thus, failed bit path(s) extending through the communications system is (are) bypassed by extra bit path(s) associated with the communications system, so that no single failure of a bit path through the transmission system can result in a failure to communicate. More generally, a number of bit path failures equal to $S_T$ can be accommodated without any degradation whatever to the system performance.

Crossbar switch 116 of FIG. 3 and stations $12_X$ and $14_X$ are conventional. FIG. 4a is a simplified block diagram of a controlled interface unit of FIG. 3. For definiteness, FIG. 4a represents controlled interface unit $104_1$ of FIG. 3. In FIG. 4a, an M-bit interface port 101 having $M=(N+C+S_T)$ bits, at the top of the FIGURE, connects to data path $15_1$ and from there to a port of switch 116 of FIG. 3. At the bottom of FIG. 4a, an N-bit interface port 105 connects to data path $115_1$ and thence to station $14_1$ of FIG. 3. Data flows from interface port 101 to interface port 105, within interface unit 104, by way of a data path designated 108, a multiplexer (MPX) block or unit 106, a further data path including a transmission path 110, an error decoding and data correction block 112, and a data path 114. Data flows from interface port 105 to interface port 101 by way of a data path including transmission path 114, its continuation transmission path 128, an error coding block 126, an (N+C)-bit transmission path 124, a multiplexer block 120, and a transmission path 122 with $M=N+C+S_T$ bits. Multiplexer blocks 106 and 120 are described in more detail in conjunction with FIGS. 4b and 4c, and error decoding and encoding blocks 112 and 126, respectively, are described in more detail in conjunction with FIGS. 4d and 4e.

Figure 4E:
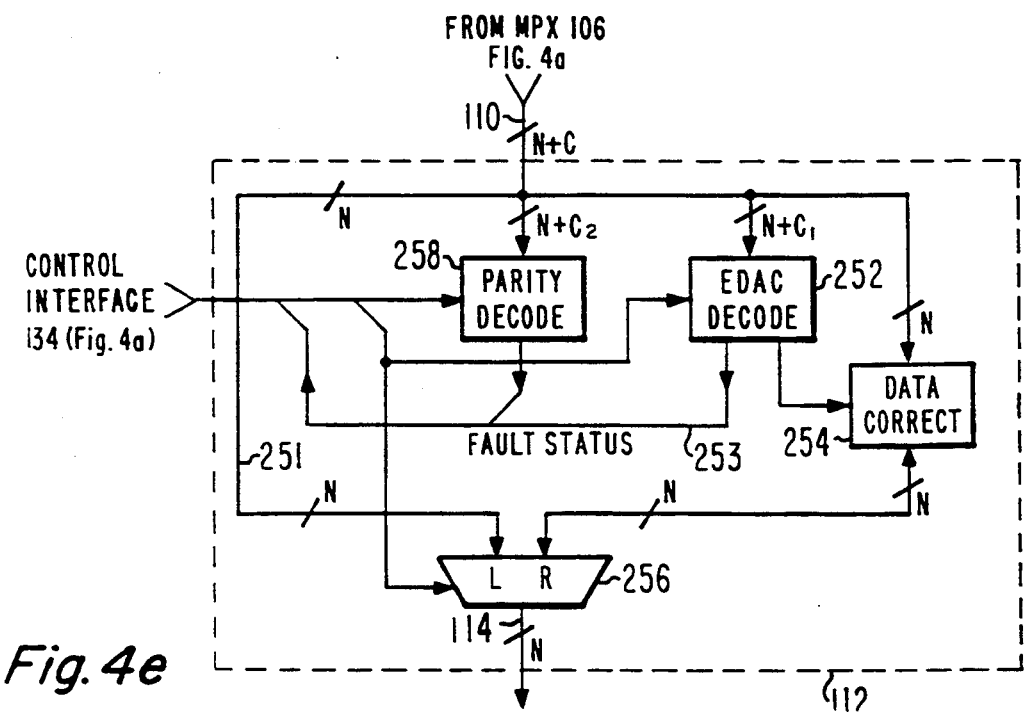
FIG. 4a is a simplified block diagram of a controlled interface unit according to the invention, which may be used in a communication system such as that of FIG. 3; the controlled interface unit includes two different types of multiplexers.
FIGS. 4b and 4c are simplified block diagrams of multiplexers which may be used in the arrangement of FIG. 4a, and FIGS. 4d and 4e are simplified block diagrams of error encoding and decoding portions of the arrangement of FIG. 4a, respectively.
Figure 4A:
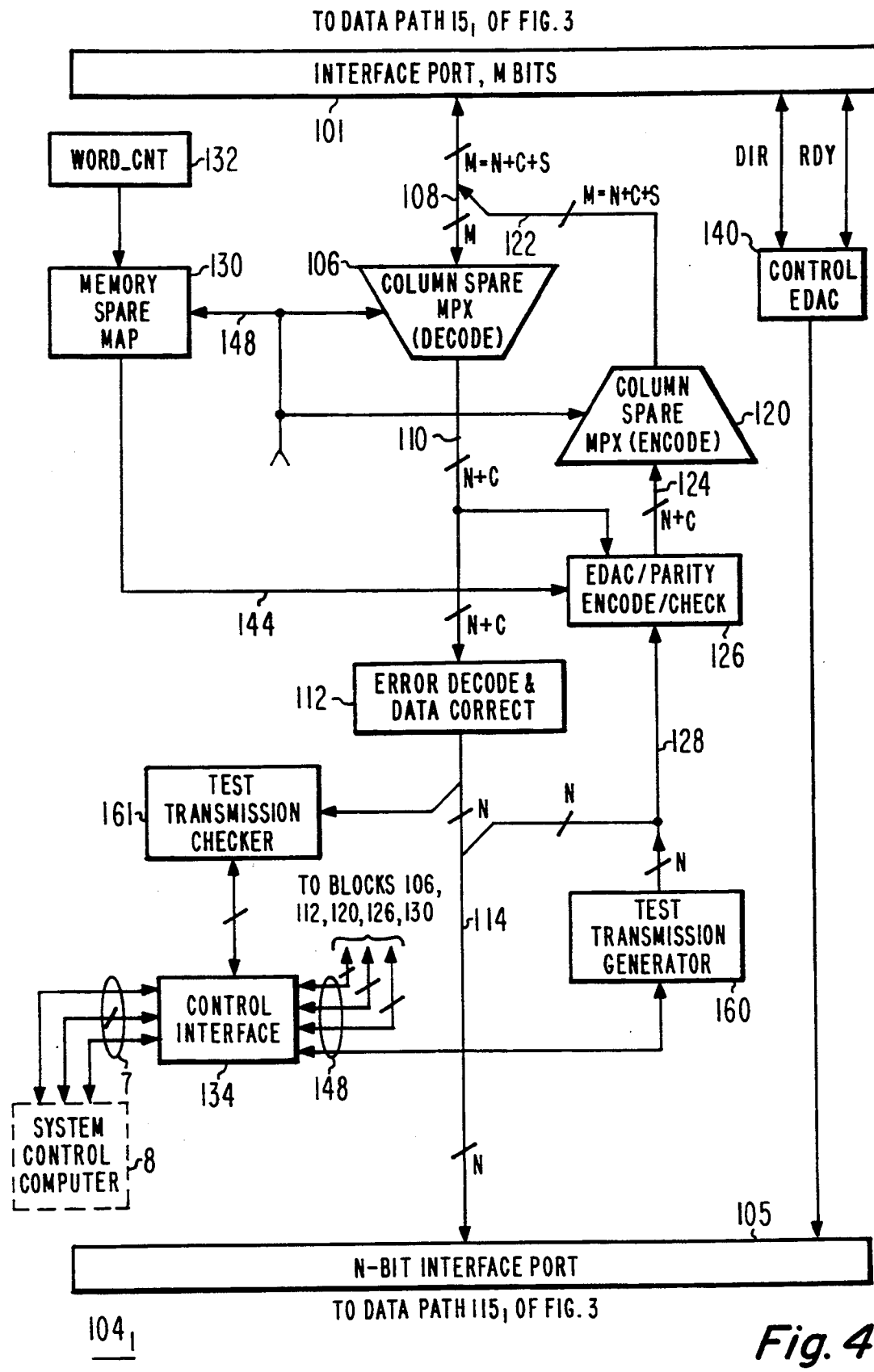
Figure 4B:
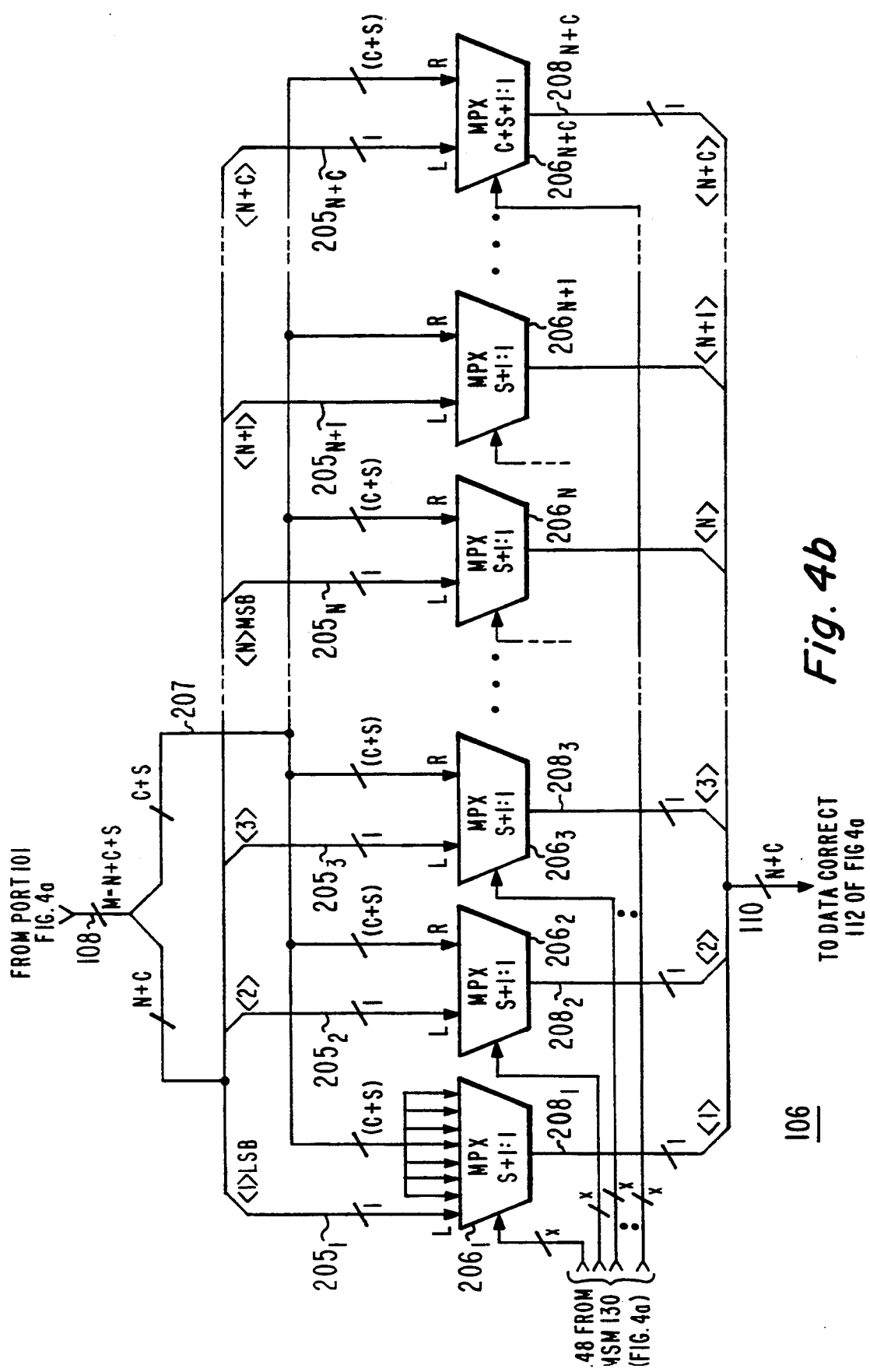

FIG. 4b is a simplified block diagram of multiplexer 106 of FIG. 4a. In FIG. 4b, elements corresponding to those of FIG. 4a are designated by like reference numerals. In FIG. 4b, multiplexer 106 includes a plurality, equal to (N+C), of ($S_T+1$)-input, single-bit-output multiplex switches or units $206_1$, $206_2$, $206_3$, ... $206_{N+1}$, $206_{N+2}$, ... $206_{(N+1)+C}$. This type of multiplex unit is ordinarily known as a "one-of-N" multiplexer, but this terminology might cause confusion, so they are termed "one-of-many" multiplex units herein. There are (N+C) multiplex units 206 within multiplexer 106 of FIG. 4b, one for each data and error coding bit. In general, each multiplex unit 206 has a number of single-bit input ports equal to ($C+S_T+1$), that is, equal to one more than the sum of the number of error coding bit paths and the number of true supernumerary bit paths, generally as illustrated in conjunction with multiplex unit $206_1$ in FIG. 4b. In the abovementioned example in which N=sixty-four, C=eight, and $S_T$=twelve, so C+S=20, and (C+S+1)=21. Thus, each one-of-many multiplex unit 206 in the example would be a one-of-twenty-one (21:1) multiplex unit, and there would be N+C=64+8=72 such multiplex units in FIG. 4b. Each bit multiplex unit also includes an output port, and further includes a control port coupled to a command or control bus 148 for control of the state of each multiplex unit 206 independently of the state of any other multiplex unit. Each bit multiplex unit 206 of FIG. 4b (including multiplex unit $206_1$) therefore includes, in the simplest case of one supernumerary bit and no error coding, at least two input ports, one for the data bit of a particular significance and the other for the spare bit.

While any bit path of the N-bit data portion of data path 108 coupled to a multiplexer 106 may be assigned to carry bits of any significance, the simplest arrangement is to apply the least significant bit (LSB) of the data signal arriving at column spare multiplexer 106 from data path 108 by way of one-bit data path $205_1$ to the left (L) input port of multiplex unit $206_1$ of FIG. 4b, thereby leaving C+S ports of multiplex unit $206_1$ available for the error coding (C) bits and (S) bits. The error coding bits and any other signal arriving by way of C+S portion of data path 108 are applied to the C+S right (R) input ports of multiplex unit $206_1$. The second-least-significant-bit of the N-bit data signal is applied to the L input port of multiplex unit $206_2$, thereby leaving C+S ports of multiplex unit $206_2$ available for the error coding and supernumerary bits. The third-least-significant-bit of the N-bit data signal is applied to the L input port of multiplex unit $206_3$. Similarly, the most significant bit (MSB) arriving on data path 108 is applied by way of one-bit data path $205_N$ to the L input port of multiplex unit $206_{N+C}$. Bits of other significance are applied by way of other one-bit data paths 205 to the L input ports of other multiplex units 206 lying between multiplex units $206_3$ and $206_N$. More specifically, the least-significant-bit of the C error coding bits is applied to the L input port of multiplex unit $206_{N+1}$, and the most-significant-bit of the C error coding bits is applied to the L input port of multiplex unit $206_{N+C}$. Error coding bits of other significance are individually applied to the L input ports of other multiplex units lying between $206_{N+1}$ and $206_{N+C}$. The C error coding bit paths, and the extra, spare or supernumerary (S) data path(s), are applied to the right (R) input ports of all multiplex units 206. Thus, if there were C=8 error coding bit paths and S=12 supernumerary bit paths, each multiplexer 206 would have twenty R ports, and a particular one of the error coding or supernumerary bit paths would be connected to the same one of the R ports of each of multiplex units $206_1$ through $206_{N+C}$.

In operation of multiplexer 106 of FIG. 4b, multiplex unit $206_1$ is normally (in the absence detection of a system failure) controlled to a state in which the signal applied to its L input port from one-bit LSB input signal path $205_1$ is coupled by way of its one-bit output port to one-bit LSB output signal path $208_1$, and any signal applied to its other or S input ports (a single other input port in the S=1 example, and twenty other input ports in the S=20 example) is blocked, and cannot pass. Multiplex unit $206_{N+C}$ is normally controlled to a state in which the signal applied to its L input port from one-bit error code MSB input signal path $205_{N+C}$ is coupled by way of its one-bit output port to one-bit MSB output signal path $208_{N+C}$. The other multiplex units $206_2$, $206_3 \ldots 206_{N+C-1}$ are similarly controlled to couple the bits of other significance applied to their L inputs by way of their output ports to paths 208 of other significance. Thus, under normal conditions, the N-bit data input signal and associated C-bit error codes (a total of N+C bits) received over data path 108 (N+C+S bits wide) are individually coupled, by way of the L ports of the (N+C) multiplex units $206_1-206_{N+C}$, where the hyphen represents the word "through", to data path 110, and the true supernumerary bit paths are not used. Control is accomplished with the aid of known error detection schemes, as described below. Thus, the N multiplex units $206_1-206_N$ of FIG. 4b couple the N data bits arriving at their L inputs onto the N portion of the N+C output data path 110, and the C multiplex units $206_{N+1}-206_{N+C}$ couple the C error coding bits arriving at their L input ports to the C portion of output data path 110, for application to data correction block 112 of FIG. 4a, all under the control of instructions received from a command or control interface block 134 of FIG. 4a over control bus 148. Control interface block 134 of controlled interface unit $104_1$ is coupled, together with all corresponding control interface blocks in other controlled interface units $102_X$, $104_X$, to control block 8 of FIG. 3, for correlated or overall control, as described below.

Figure 4C:
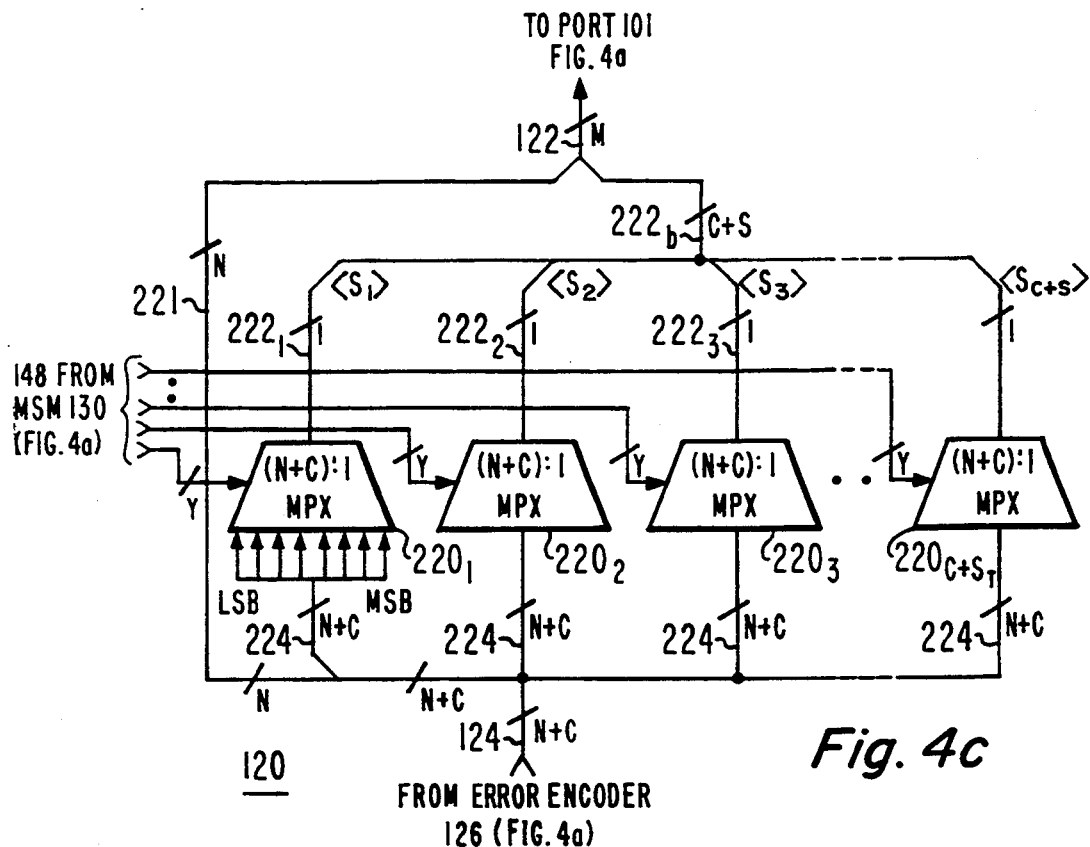

FIG. 4c is a simplified block diagram of multiplexer 120 of FIG. 4a. Elements of FIG. 4c corresponding to those of FIG. 4a are designated by like reference numerals. In FIG. 4c, (N+C)-bit input data path 124 is coupled directly to M-bit output data path 122 by an interconnecting N-bit bypass data path 221. This arrangement allows the N-bit data signal portion of an N-bit data signal with C-bit error coding arriving on data path 124 to be coupled directly to an N-bit portion of M-bit data path 122 under normal (no defective bit paths) conditions. There are $C+S_T$ one-of-many multiplex units 220 in multiplexer 120 of FIG. 4c. In particular, FIG. 4c illustrates one-of-many multiplex units $220_1$, $220_2 \ldots 220_{C+ST}$. Since there are $C+S_T$ multiplex units 220 in multiplexer 120 of FIG. 4c, there is one multiplex unit 220 for each bit of the C-bit error coding signals arriving at multiplexer 120 over data path 124 from error coding block 126 of FIG. 4a, and $S_T$ additional multiplexers 220. Each one-of-many multiplex unit $220_1$, $220_2 \ldots 220_{C+ST}$ has a single output bit path $222_1$, $220_2, \ldots 220_{C+S}$, respectively, which couples to one bit path of an S-bit supernumerary portion $222_b$ of data path 122, where $S=C+S_T$, and thence to one bit path of data path 108 of FIG. 4a. Each multiplex unit $220_1$, $220_2 \ldots 220_{C+ST}$ of FIG. 4c also has an input data path 224 including N+C bit paths, which is coupled to source N+C data path 124, and in parallel with the corresponding bit paths of the input data paths of all other one-of-many multiplex units $220_1$, $220_2 \ldots 220_{C+ST}$, and of which, as mentioned above, N bits are also coupled to the corresponding bits of N-bit bypass data path 221. Each one-of-many multiplex unit $220_1$, $220_2 \ldots 220_{C+ST}$ has a blocking state, in which all inputs are inhibited or blocked from proceeding to its output bit path $222_1$, $220_2, \ldots 220_{C+S}$, respectively, and also has an unblocked or transmissive state, in which it controllably selects, from among all of its N+C input bit paths, one of the bit paths for application to its single output bit path $222_1$, $220_2, \ldots 220_{C+S}$.

Under normal conditions, in which the bit paths in data paths 122 and 108 of FIG. 4a are unbroken, and the corresponding bit paths $15_1$, and through crossbar switch 116 of FIG. 3, are unbroken, the LSB, MSB and bits of intermediate significance applied over data path 124 of FIG. 4a to multiplexing unit 120 may be coupled by data path 221 of FIG. 4c to corresponding bit paths of output data path 122. Also under normal conditions, C of the one-of-many multiplex units $220_1$, $220_2 \ldots 220_{C+ST}$ are transmissive, coupling the C error coding bits from input data path 124 to C of the $S=C+S_T$ supernumerary data paths in M-bit output data path 122. The remaining $S_T$ true supernumerary bits of the output data path 122 are not used, and the corresponding ones of multiplex units 220 of FIG. 4c are in a blocking state.

In the event that a particular system bit path is determined to be nontransmissive, control signals on control bus 148 of FIGS. 4a, 4b and 4c are readjusted by control interface block 134 of FIG. 4a to cause a corresponding one-of-many multiplex unit, such as multiplex unit $220_{C+ST}$ of FIG. 4c, to route the signal bit onto one of the S spare bit paths of M-bit data path 122. The defective data bit is preferably routed onto one of the $S_T$ bit paths, if available., so that the C error coding bits continue to be transmitted. Suppose, for example, that the second-most-significant-bit (SMSB) path of M-bit data path 122 were nontransmissive, but all other bit paths were transmissive; the SMSB bit would then not be arriving at the destination at the remote end of data path 122. When this condition is detected, as described below, one of the one-of-many multiplex units 220 of FIG. 4c, as for example multiplex unit $220_1$, would be placed in its transmissive state, selecting the SMSB input to couple to its spare output bit path $222_1$, designated spare bit path 1 or $<S_1>$ in FIG. 4c. Since spare bit path $<S_1>$ is presumptively functional, the full N-bit signal arriving over data path 124 would appear at the remote end of data path 122, with the LSB, MSB and all bits of other significance occupying their normal positions in the N-bit portion of M-bit data path 122, but with the SMSB appearing on bit path $<S_1>$ of the S-bit portion of M-bit data path 122. Naturally, if only one supernumerary bit path is available, no further failures can be accommodated. If, on the other hand, there are a plurality S of supernumerary bit paths in the S-bit portion of M-bit data path 122, and if, in addition, there is a like number of multiplex units 220 connected as depicted in FIG. 4c, then as many as S transmission failures can be simultaneously accommodated.

In the abovementioned example, N equals sixty-four data bits, C equals eight EDAC error coding bits, and S equals eight error coding bits plus twelve true supernumerary bits $S_T$. Assume that twelve of the sixty-four data bits have become defective, and are currently being routed through the true supernumerary bit paths. It might seem that no further errors could be accommodated by the system. According to another aspect of the invention, however, additional bits are made available for carrying defective data bits, by changing from one type of error coding to another type which requires fewer bits. For example, the EDAC error coding could be changed to parity coding, which requires fewer bits. Of course, changing from EDAC to parity coding eliminates the EDAC capabilities, replacing them with the capabilities of parity coding. Thus, the EDAC capabilities of error correction and direct identification of the defective bit location are given up, and replaced by simple identification of the existence of an error in the transmission. If EDAC coding requires eight bits, as in the above example, and parity coding of two 32-bit blocks of the 64 data bits requires two bits, six bits can be freed for use in carrying additional defective data bits, thereby raising the total number of defective data bits which can be accommodated from twelve to eighteen. As described below, test transmissions are commanded in response to error identifications by the parity coding, to thereby determine which data bits are defective.

Figure 4D:
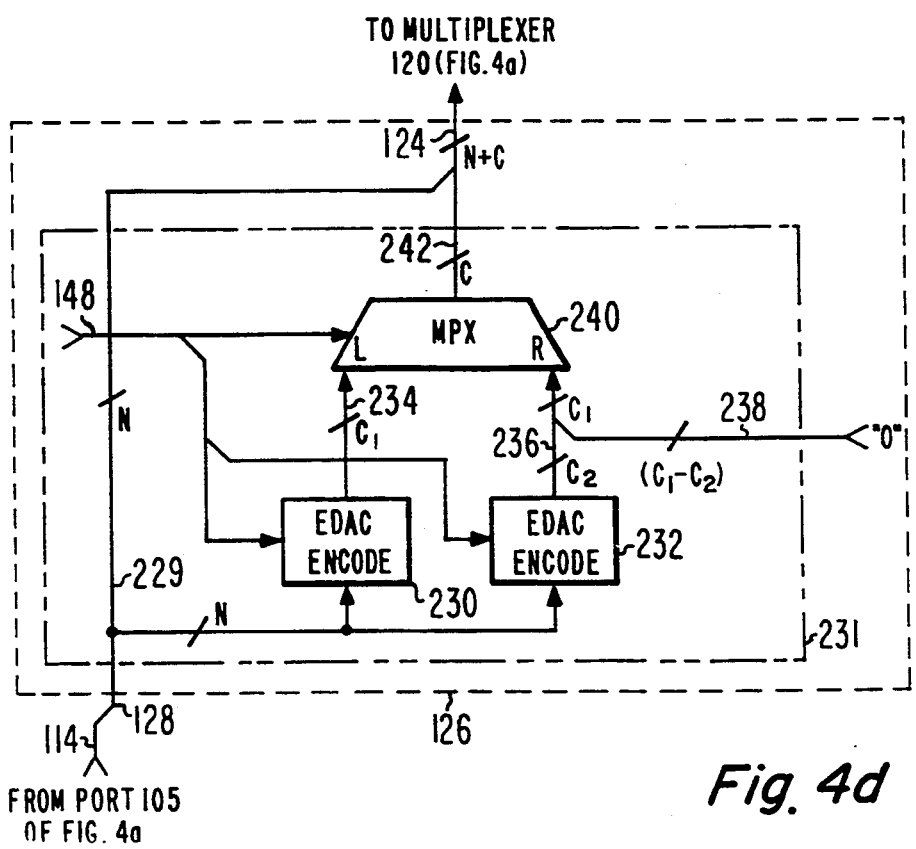

FIG. 4d is a simplified block diagram of EDAC/parity encoding block 126 of FIG. 4a. In FIG. 4d, N-bit data applied over data path 128 is applied by an N-bit bypass data path 229 to the N-bit portion of (N+C)-bit output data path 124. Since the error coding circuits must know what the data bits are in order to perform the coding function, the N-bit data is also applied to the inputs of an EDAC coding block 230 and a parity coding block 232 of a coding arrangement 231. EDAC coding block 230 and parity coding block 232 are coupled to branches of control bus 148, to receive enable and disable commands from control interface block 134 of FIG. 4a. When enabled, EDAC coding block 230 produces its error coding, with $C_1$ bits, which in the example is eight bits, on $C_1$-bit data path 234 for application to the $C_1$-bit left (L) port of a multiplexer 240. Similarly, when enabled, parity encoder 232 produces its error coding, with $C_2$ bits, which in the example is two bits, on $C_2$-bit data path 236. Data path 236 is joined by additional "0" or logic low bits, sufficient in number to make the total number of bits applied to the right (R) port of multiplexer 240 equal to $C_1$. Multiplexer 240 couples either the $C_1$ EDAC bits from its L port or the $C_1$ parity-plus-zeroes bits from its R port to C-bit output path 242, under the control of commands applied from control interface block 134 of FIG. 4a over control bus 148. Thus, C-bit path 242 of FIG. 4d carries $C_1$ EDAC data bits, eight in number in the example, so long as the number of defective data paths in the communication system does not exceed the number $S_T$ of true supernumerary bits, and when the number of defective data bits exceeds $S_T$, path 242 carries $C_2$ parity bits, together with additional "empty" bits, which in the example is two parity bits and six zeroes. The C-bit signal on data path 242 joins the N-bit data on bypass path 229 to form (N+C)-bit signal on output data path 124 for application to multiplexer 120 of FIG. 4a.

FIG. 4e is a simplified block diagram of error decoding block 112 of FIG. 4a. In FIG. 4e, N-bit data, together with $C_1$- or $C_2$-bit error coding data, depending upon the number of defective data bits and the resulting operating mode of encoder 126 of FIG. 4d, is applied over (N+C)-bit data path 110 to error decoder 112 of FIG. 4e. In normal operation with no defective data bits, the N-bit data is applied to an EDAC decoder 252, an error correction block 254, a parity decoder block 258, and to the L port of a multiplexer 256. However, parity decoder block 258 is disabled in the normal operating mode, or its output is not used if it is enabled. Instead, EDAC decoder 252 operates on the received data and error codes, and generates error information, which is applied to data correction block 254 to enable block 254 to correct the data. EDAC decoding block 252 also produces fault status information such as error presence and location information, which is applied over a path 253 to control bus 148, for transmission to control interface block 134 of FIG. 4a. As mentioned, the uncorrected data is applied from data correction block 254 by an N-bit path 255 to the R input port of a multiplexer 256. The uncorrected data from an N-bit bypass bus 251 is applied to the L input port of multiplexer 256. In normal operation, the corrected data from block 254 is preferred, so multiplexer 256 is commanded to couple its R input port to its N-bit output data path 114. The operation of block 112 of FIG. 4e is the same as that described above, so long as the number of defective data bits does not exceed the number $S_T$ of true supernumerary data paths, because the defective bits are rerouted by multiplexer 106 of FIG. 4a before they get to error decoder and data correction block 112.

In the event that the number of defective data paths exceeds the number $S_T$ of true supernumerary bit paths, error encoder 126 of FIG. 4a is commanded to encode parity rather than EDAC, and, in a similar fashion, commands are applied over command bus 134 to EDAC decode block 252 and parity decode block 258 of FIG. 4e, to disable EDAC decoding, and enable parity decoding. In the example, the sixty-four bit data signal may have parity applied to two thirty-two bit blocks, such as the LSB and MSB blocks, which produces the two parity bits of the example. The parity decoder cannot produce enough information to allow error correction, but simply identifies the presence or absence of an error in the data block. Since the parity decoding does not correct the data, multiplexer 256 is commanded to switch, and couple the data from its L input port to output path 114. The data applied to the L input port, as mentioned above, is the uncorrected N-bit data from bypass path 251. This allows uncorrected data to flow through the controlled interface unit to the utilizing station, but the presence of an error is signalled by parity decoder 258, so that other measures can be taken, such as retransmission of the message, to continue operation. Allowing uncorrected data to flow through the system in this manner is considered preferable to complete cessation of operation, as would occur if there were no additional functional data paths beyond the $S_T$ true supernumerary bit paths.

Figure 5A:
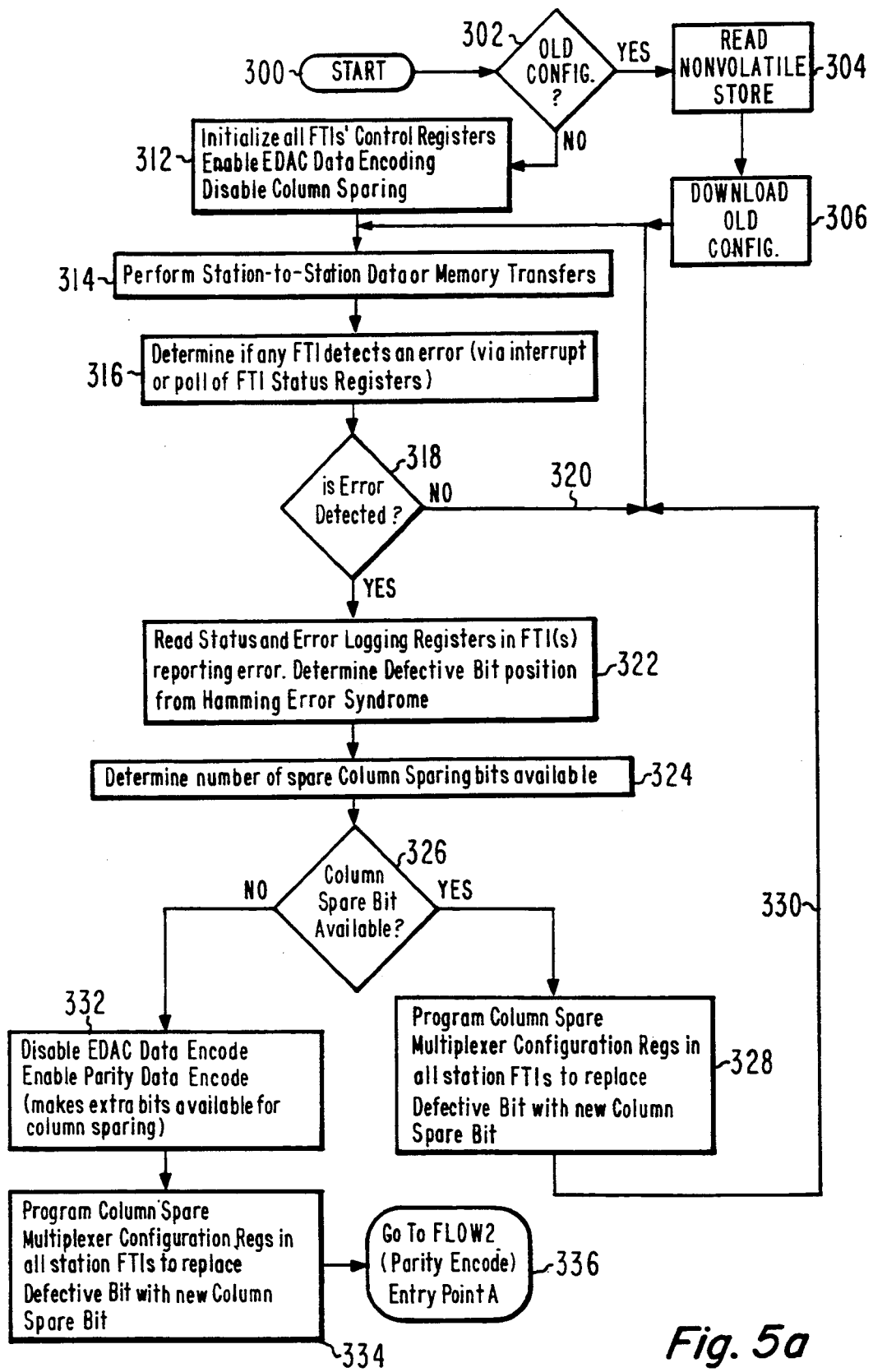
FIGS. 5a, 5b and 5c together constitute a logic flow chart illustrating control of the arrangement of FIG. 3 and FIGS. 4a, 4b, 4c, 4d, and 4e in one method according to the invention.
Figure 5B:
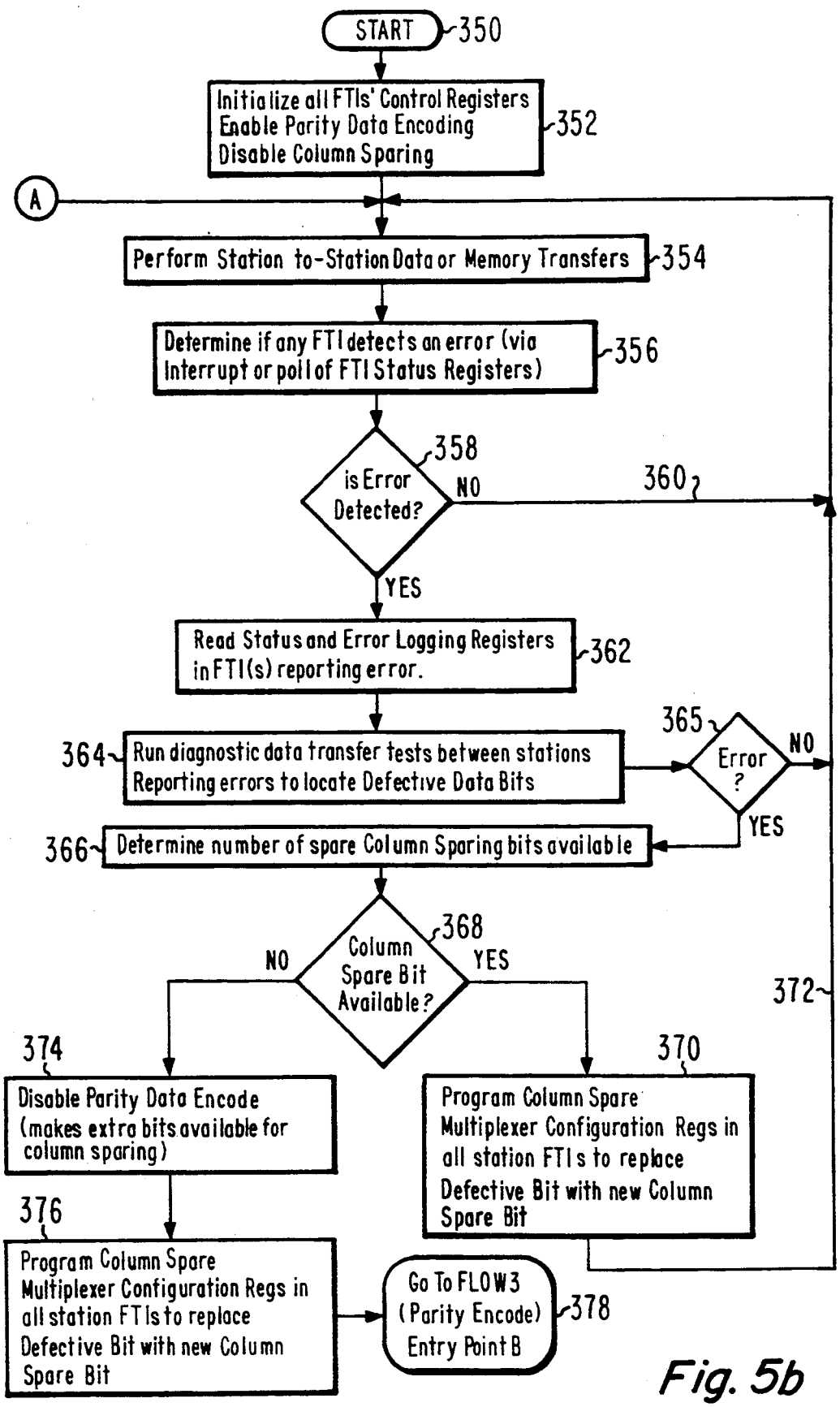
Figure 5C:
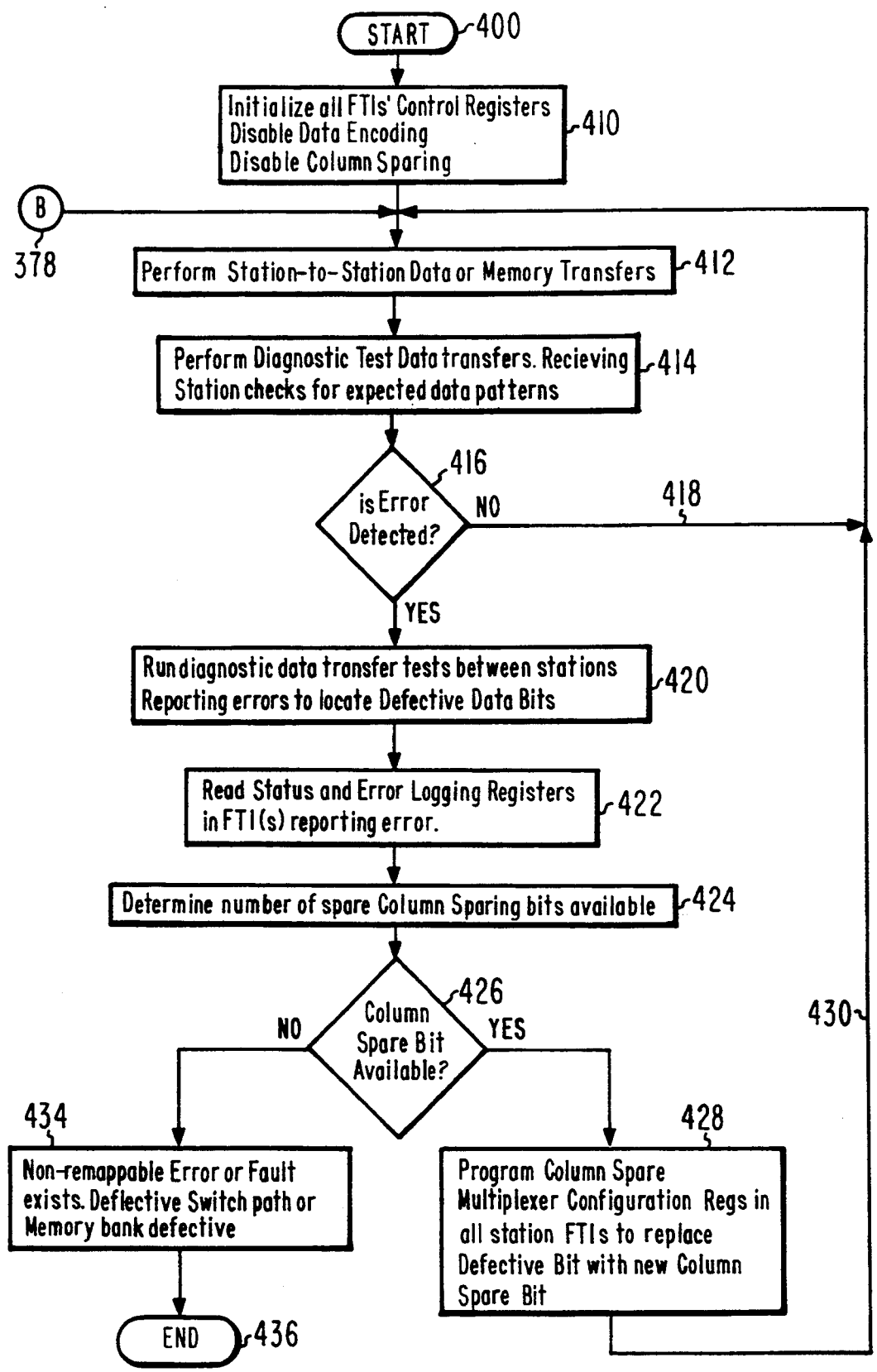

FIGS. 5a, 5b and 5c together constitute a flow chart illustrating one scheme for controlling the communication system of FIGS. 3 and 4a, 4b, 4c, 4d, and 4e in accordance with an aspect of the invention. In FIG. 5a, the logic flow starts at a START block 300, and flows to a decision block 302, which reads a "previous configuration" flag. If a previous configuration does not exist, the logic flows to a block 312, which represents initialization of all registers in the system to a nominal condition, such as by setting all error logging registers to zero. Block 312 also represents the enabling of EDAC error coding and decoding, and disabling of parity coding. If a previous configuration exists, the logic leaves decision block 302 by the YES output, and flows to a block 304, which represents reading of a nonvolatile store containing information about the previous configuration. From block 304, the logic flows to a block 306, which represents reconfiguring the EDAC or parity conditions, and the spare configurations of the station interface units. Whether or not a previous configuration exists, the logic flows from either block 306 or 312 to a block 314, which represents the initiation of test transmissions if data transmissions are not taking place. Block 316 represents the reading or polling of all error logging registers. When the registers have been read, the logic proceeds to a decision block 318, in which the presence or absence of an error redirects the logic flow. In the absence of an error, the logic leaves decision block 318 by the NO output, and flows back to block 314 by way of a logic path 320. When an error is identified, the logic leaves decision block 318 by the YES output, and arrives at a block 322, representing reading of the error logging registers associated with the error, and determining the error bit location, as by evaluation of the Hamming Error Syndrome associated with the EDAC coding. From block 322, the logic flows to a block 324, which represents the determination of the number of true supernumerary bit paths which are in use. A nonvolatile store, which may be located in control unit 8 maintains a log of the failure locations. When the system is initially turned on, there may have been a large number of defects which have arisen as a result of years of operation in an adverse environment. To avoid having the system re-identify all the errors, and perform all the reconfigurations, the control unit re-establishes the prior configuration. In some applications, it may be possible that the failures will "heal" themselves, in which case, the system can start from a "virgin", non-reconfigured condition, and perform the reconfiguration as the errors are detected, either through normal data transfers or through special testing. Assuming that the supernumerary bit paths are assigned in sequence to correction of errors, knowledge of the number of supernumerary bit paths in use also identifies the next one to be used. If an ordinary numerical sequence is not used for some reason, the available bit paths must also be determined. From block 324, the logic flows to a decision block 326, which compares the number of true supernumerary bit paths in use with the available number of true supernumerary bit paths. If the number in use is less than the number available, a supernumerary bit path is available, and the logic leaves decision block 326 by the YES output, and proceeds to a logic block 328. Logic block 328 represents the assignment of the next supernumerary bit path in sequence to the current defective bit, and commanding all the multiplexers in all the controlled interface units to switch accordingly. From block 328, the logic flows back to block 314 by a logic path 330.

If all the true supernumerary bit paths are in use, the logic leaves decision block 326 of FIG. 5a by the NO output, and proceeds to a block 332. Block 332 represents disabling of the EDAC encoding and decoding, and the enabling of parity encoding and decoding, in order to make a number of additional supernumerary bit paths available. In the numerical example, the EDAC used eight bits, and the parity encoding only two bits, thereby freeing six additional supernumerary bit paths for use in carrying defective bits. From block 332, the logic flows to a further block 334, which assigns the next available one of the additional supernumerary bits to the current defective bit, and instructs the multiplexers in all the controllable interface units to switch configuration to route the current defective bit through the newly freed supernumerary bit path.

When the EDAC error coding has been disabled and the parity coding enabled as a result of the presence of a number of defective bits exceeding the number of true supernumerary bit paths, operation of the system using EDAC coding, as contemplated in the flow chart portion of FIG. 5a, is no longer possible. From block 334 of FIG. 5a, the logic flows to a block 336, corresponding to A block 336 of the flow chart portion of FIG. 5b.

If the communication system control logic is started in the parity error coding mode of operation, the logic begins at a block 350 of FIG. 5b, and flows to a block 352, which represents the initialization of all the fault logging registers, enabling of parity encoding and decoding, and disabling the EDAC coding and decoding. From block 352, the logic flows to block 354, which is also the starting point for logic transfer from the flow chart portion of FIG. 5a. In the parity encoding mode, operating data is transferred among stations, or in the absence of operating data, test data is transmitted, according to block 354. Logic block 356 represents reading the error logging registers. From block 356, the logic arrives at a decision block 358. Decision block 358 reroutes the logic according to the presence of absence of an error in the last data transmission. If no error is identified, the logic flows back to block 354 by way of logic path 360. If a "hard" error (a permanent error) is identified, the logic flows to a block 362, which represents reading the error logging registers associated with the error, to determine, for example, which of the thirty-two bit LSB or MSB blocks of data contained the error. As illustrated, the control system assumes that a single error constitutes a hard error, but if single event upsets (SEUs) are expected, control interface 134 may count the errors, and form a fault-to-good transmission ratio, whereupon a "hard" fault is represented by a ratio which exceeds a threshold value. Block 364 represents the enabling of test transmission generator 160 of FIG. 4a, to cause it to send test transmissions in the appropriate LSB or MSB portion of the data path, through error encoder 126, multiplexer 120, and out interface port 101 to crossbar switch 16 of FIG. 3. At each receiving interface unit, a test transmission checker 161 receives the test transmissions, evaluates them and supplies the result to interface block 134. The crossbar switch can be stepped to couple the test signal to all possible controlled interface units, to test all paths from the source of the test signals, or, if the source of the data signals in which the error occurred is known, the crossbar switch is set to couple the test signal through that same path. The logic flows from block 364 to decision block 365, which determines if an error has been identified. There is the possibility that the test will show no errors, in which case any error is assumed to have been an SEU. If no error was identified, the logic leaves decision block 365 by the NO output, and returns to block 354. If an error was identified, the location of the defective data bits is determined. The logic then flows to a block 366, which represents the determination of the number of the currently available supernumerary bits. These are the bits which were previously freed for use by switching from EDAC to parity error coding. By the time block 366 is reached for the first time, one of those supernumerary paths has already been used, as described in conjunction with block 334 of FIG. 5a. Decision block 368 of FIG. 5b evaluates the number of supernumerary bits remaining, and reroutes the logic flow by way of the YES output to block 370 if paths remain available. Block 370 represents assignment of the next one of the available supernumerary bit paths to the currently identified defective bit. This means that the multiplexers of all the controlled interface units 102 and 104 of FIG. 3 are reconfigured to route the defective bit over the selected supernumerary path. From block 370, the logic flows back to block 354 by way of logic path 372. The currently identified defective bit having been rerouted, operation continues, with the logic traversing the loop including blocks 354, 356, the NO output of decision block 358, and logic path 360 back to block 354, until the next hard error occurs. Each time a hard error occurs, a supernumerary path is assigned by the flow of FIG. 5b, until no more supernumerary bit paths are available, and a further hard error occurs. When the next hard error occurs following assignment of the last of the supernumerary bit paths by block 378 of FIG. 5b, the logic will be rerouted by the NO output of decision block 368 to a block 374, which represents the disabling of both the EDAC and the parity error coding. The logic then flows to a block 376, in which one of the newly freed supernumerary bits is assigned to the defective data bit. From block 376, the logic flows to a transfer block 376, which represents a transfer to corresponding block B of FIG. 5c.

If the control logic is started in a no-error-correction mode at START block 400 of FIG. 5c, the error logging registers are initialized, and both EDAC and parity error coding are disabled in a block 410. From block 410, the logic flows to a block 412, which is the starting point of the logic transferred from the logic of FIG. 5b by way of B transfer block 378. In FIG. 5c, logic block 412 represents commands which allow normal data transmissions. Block 414 represents commands which break the normal data transfer, or which, during normal breaks in the data transfer, represent commanding of test transmissions by test transmission generator 160 of FIG. 4a, and reception of the expected data patterns by corresponding test transmission receivers. From block 414, the logic flows to a decision block 416, which evaluates the results of the test transmissions and receptions. If no errors are identified, the logic leaves decision block 416 by the NO output, and proceeds back to block 412 by logic path 418. In the event that an hard error is identified, the logic leaves decision block 416 by the YES path, and arrives at a block 420. Block 420 represents the running of diagnostic tests between stations reporting errors, in order to identify defective bits. Block 422 represents the reading of error logging registers which record the errors arising from the diagnostic tests of block 420, and block 424 represents the determination of the number of supernumerary bits available. In the above described example in which the data was sixty-four bits, true supernumerary bits was twelve, EDAC was eight bits, and parity coding occupied two bits, only one supernumerary bit can remain at this point in the flow chart, because parity was disabled in block 374 of FIG. 5b, freeing two bits for supernumerary use, and one of those bits was immediately assigned to the then current defective bit, leaving only one remaining supernumerary bit. However, for generality, the evaluation can be performed. If a bit is available, the logic leaves decision block 426 by the YES output, and proceeds to a block 428, which represents the assignment of the next one of the remaining supernumerary bit paths to the currently defective bit. The logic then returns to block 412 by logic path 430. The loop including blocks 412, 414, 416, 420, 422, 424, 426 and 428 continues to assign currently available supernumerary bits to currently identified defective data bits until the number of supernumerary data paths is exhausted, whereupon the logic is rerouted by decision block 426 to leave by the NO output. From the NO output of decision block 426, the logic flows to a block 434, which represents the assignment of a non-remappable error or fault, and the logic then flows to an END block 436.

In operation of the system as so far described, a fault in a data line may be detected either by the EDAC/parity features, or by test programs. The system control computer (8 of FIG. 3) interrogates control interface block 134 of controlled interface units 104 at the receiving end of the data transmission to determine if an error in a received signal has occurred. Each control interface block 134 includes status and error logging registers which, for the control interface block at controlled interface units at the data receiving end of communication transmissions, indicate the presence of a parity or EDAC error, and its bit location. The system control computer reads the status and error logging registers, and responds to the existence of an error at a given controlled interface unit $102_X$, $104_X$, by interrogating its control interface block 134 to determine the error location, namely the particular bit of the N bits which is in error. Once the bit position is known, the control computer instructs all the control interface blocks 134 at the controlled interface units $102_X$, $104_X$ to command (a) allocation of a spare bit path in the associated multiplex unit 120 to the defective bit, and (b) instructs the control interface block 134 of all other controlled interface units 102, 104 to reconfigure their multiplex units 106 in a corresponding manner. For example, if only one bit is in error, the reconfiguration of multiplex unit 120 of FIG. 4c might select the available spare bit paths in sequence, by placing one-of-many multiplexer $220_1$ in a non-blocking mode, to pass the bit of the particular significance in which the error was detected. Thus, if the error was in the second most significant bit of the N-bit data, the second most significant bit of multiplexer $220_1$ would be enabled. Thus, one of the controlled interface units will be at a "transmitting" location, and at that location the second-MSB of the data is transmitted over the $S_1$ spare bit path. At all of the other interface units $102_X$ or $104_X$ of FIG. 3, the instructions from the control computer, by way of the control interface block 134 in each controlled interface unit 102 or 104, also command the enabling of multiplexer $206_2$ of FIG. 4b, which responds by blocking the second MSB of the N-bit data path, and passing the data from the $S_1$ spare bit path to its output. Thus, the data which would normally traverse the defective second-MSB path in any transmission is rerouted over the intact spare bit path. By commanding all controlled interface units to "spare" the same bit, communication is guaranteed for all transmit-receive pairs, although some pairs may not require the spare path.

When a second path error is detected in the system, the control computer again detects the presence of the error and its bit location, and commands all the controlled interface units to allocate the second spare bit to the new defective bit position. This does not change the previous spare bit allocation, so that both spare bit paths are used for all transmit-receive pairs, even though not all of them require the spare. Clearly, the number of defective bit paths which can be accommodated in this manner equals the number of spare bit paths available. As so far described, the invention advantageously allows the use of controlled interface units external to the crossbar switch to improve the reliability of the communication system, without the addition of further crossbar switches. However, it does require a "wider" crossbar switch, with more bit paths than the minimum required to carry the basic data stream.

In FIG. 4a, a control EDAC block 140 provides "handshake" information between the interface unit and other interface units, or to the crossbar switch. In general, this requires at least two bit lines for control signal, one outgoing and one incoming. Since these two bit paths would constitute potential single-point failure possibilities, a plurality, such as ten (five in, five out) bit paths are provided, and majority three-of-five voting is performed in block 140 to provide fault tolerance to control-line failures.

A memory 130, termed a "memory spare map" is coupled by command bus 148 to control interface 134, EDAC/parity encoder block 126, and multiplexers 106 and 120, for purposes described below. A test transmission generator 160 is coupled by data path 128 to EDAC/parity encoder block 126, for, on command, generating a sequence of test transmissions, such as "walking ones", for applying test signals to the individual bit paths of that portion of the communication system receiving the transmissions.

Figure 6:
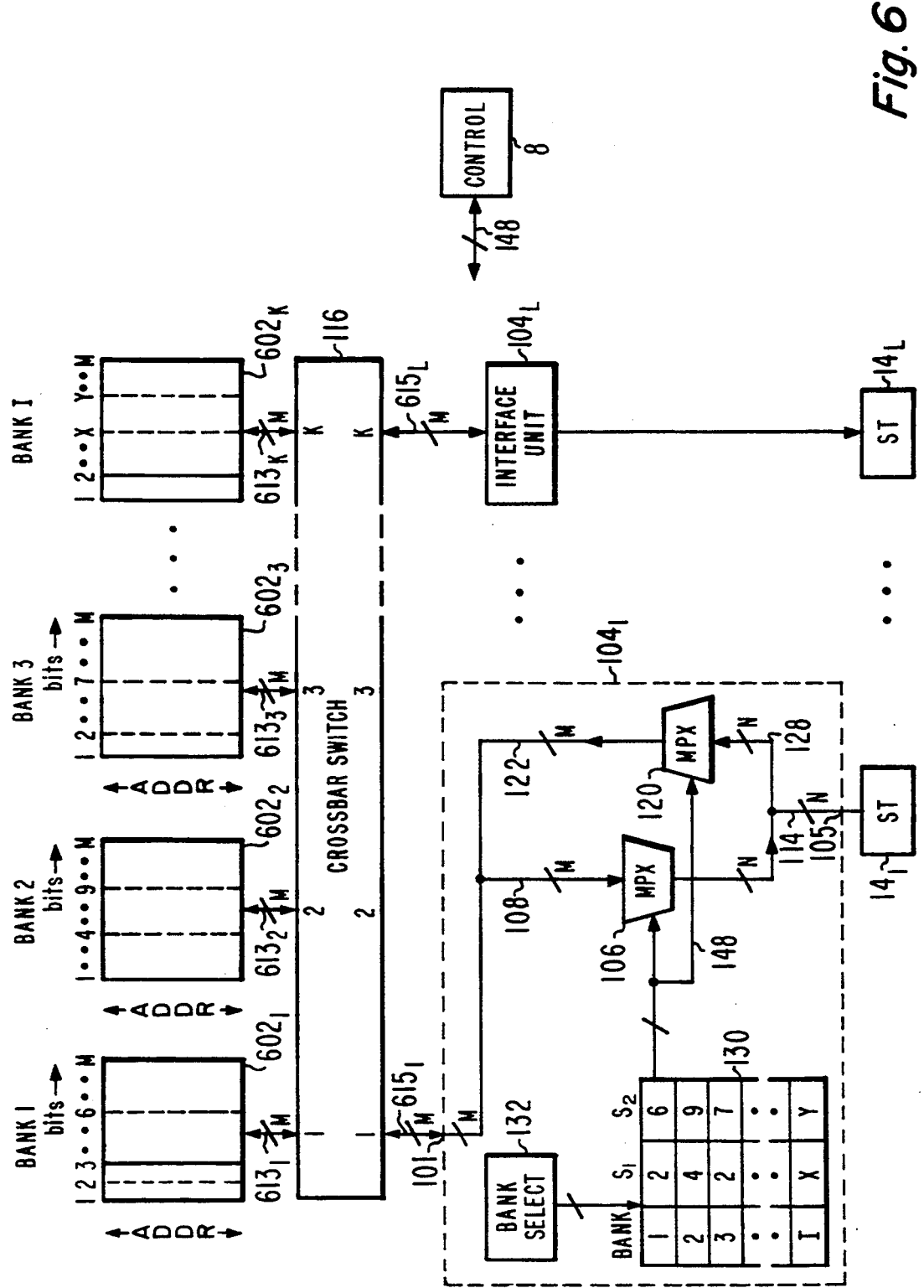
FIG. 6 is a simplified block diagram of a system according to an aspect of the invention, which is similar to FIG. 3, but in which some of the stations and their interface units have been replaced by individual memory banks, which are subject to column defects.

FIG. 6 is a simplified block diagram of a communication system according to an aspect of the invention. The arrangement of FIG. 6 is similar to FIG. 3, but differs, in that some of the stations and associated interface units, namely stations $12_1$–$12_K$ and associated interface units $102_1$–$102_K$, are replaced by individual banks of random access memory (RAM) $602_1$, $602_2$, $602_3$, ... $602_K$. As mentioned previously, there was no difference between stations 102 and 104 in FIGS. 1 and 3, and similarly the replacing of all of stations 12 by memory is arbitrary, less than all stations 12 could be replaced with memories, or all of stations 12, and some of stations 14 could have been replaced. The arrangement of FIG. 6 allows communication between stations $14_1$–$14_L$ and memories $602_1$–$602_k$, corresponding to memory banks 1 through I, by way of M-bit data paths $615_1$–$615_L$, crossbar switch 116 acting as a memory bank selector, and M-bit data paths $613_1$–$613_K$. Such a system might find use, for example, in a communication system in which data must be both manipulated and stored.

Each memory bank $602_1$–$602_K$ may be considered to include P addresses, in which each address identifies storage locations for a plurality of words. When a word is stored, it may be stored with error coding bits, to allow error detection and correction, or with parity coding, to at least identify the presence of an error. According to an aspect of the invention, the memory is arranged with additional bits at each of the P memory addresses, so that extra bits can be stored, over that number of bits required to store the actual data words. For example, if each data word to be stored is N bits long, which in an example is sixty-four bits, and C (eight) bits of EDAC error coding are desirably associated with each data word, the number of bit storage locations for each word would be M, where $M = N + C + S_T$, and $S_T$ represents true supernumerary bit storage locations. As described below, this arrangement, together with a "column spare" memory in at least some of the controlled interface units $104_X$ (and in some of controlled interface units $102_X$, if appropriate), allows operation to continue despite column memory defects in the memory banks.

In FIG. 6, memory bank 1, designated $602_1$, has its word address locations illustrated as being along the left side of the block, and the bit locations associated with each word are laid out along the top of the block, ranging from bit location 1 through bit location M. The "columns" of bit memory locations are illustrated within each memory block $602_X$ by a vertical line. For example, the first bit location column in memory $602_1$ is represented as a solid vertical line 604. Similarly, the third bit location column is represented as a solid vertical line. Within each memory 602 of FIG. 6, the status of the column of bit storage locations is represented by the type of line; a solid line represents an operable column of bit storage locations, and a dash line represents a defective column of bit storage locations. Thus, column bit storage locations (columns) 1 and 3 of memory $602_1$ of FIG. 6 are operable, but column 2 is defective, and column 6 is also represented as being defective. Additional or supernumerary column storage locations could be associated with each memory bank, sufficient in number to compensate for the expected maximum number of defective columns in that particular memory. Thus, if a maximum of two defective columns were expected to be associated with each memory, two additional columns of memory bit storage locations could be added, so that the number of storage bits M of each word would be $M = N + C + S_T$, where $S_T$ equals two, and M in the example would be seventy-four. The two $S_T$ columns, being spares, are then placed in service when other columns become defective.

It is not to be expected that the same columns of bit storage locations will become inoperative in each of the memories. Thus, in memory bank 1, bits 2 and 6 are illustrated as being defective. In memory bank 2 ($602_2$), bit columns 4 and 9 are defective, in memory bank 3 ($602_3$), columns 2 and 7 are defective, and in general, as in memory bank I ($602_K$), columns X and Y are defective. A scheme such as that described in conjunction with FIGS. 3, 4a, 4b, 4c, 4d, 4e, 5a, 5b, and 5c could be used to spare the extra columns of the memories. In such an arrangement, when columns 2 and 6 of memory bank 1 became defective, as determined by return of their stored data with particular bits corrupted, columns 2 and 6 of memory bank 1 would be replaced by spare column M and its preceding column M−1 (not illustrated). The corresponding columns 2 and 6 of all the other memories are also replaced with their columns corresponding to the above-mentioned columns M−1 and M. In the example of two spare columns, all the spares are now used up, and recourse would be had to dropping the error coding to free additional bit columns to handle any additional column defects. If a larger number of spare bit columns than two is available, more defective columns can be corrected, of course, but if an average of two defective columns per memory bank is expected, for example, and there are sixty-four memory banks (I=64), the provision of spare columns would at least double the required size of each memory bank.

According to a further aspect of the invention, memory 130, associated with each of controlled interface units $104_X$, is arranged to map the defective columns in memory banks 1-I of FIG. 6. As illustrated in FIG. 6, column spare memory 130 includes storage locations for each bank of memory, designated 1, 2, 3, . . . I. A plurality of storage locations are associated with each bank storage location of memory 130 of FIG. 6, for storing the locations of the defective bit columns of the memory banks. For example, memory 130 has the digits 2 and 6 stored at memory locations associated with memory bank 1, thereby indicating that those bit columns of memory bank 1 are defective and must be spared. Similarly, the storage locations associated with memory bank 2 in memory 130 contain the digits 4 and 9, corresponding to the defective bit columns in memory bank 2. Also in memory 130, bit columns 2 and 7 of memory bank 3 are represented as being defective, and bit columns X and Y of memory bank I. Unlike the arrangement described in conjunction with FIGS. 3, 4a, 4b, 4c, 4d, 4e, 5a, 5b and 5c, the arrangement of FIG. 6 adapts the sparing to the particular memory bank being addressed, so that the spare columns of each memory bank can be allocated to the defects of only that particular memory bank, and no other. Thus, when station $14_1$ accesses memory bank 1 by way of its controllable interface unit $104_1$ for storage of data bits therein, and the defective bit column locations in memory bank 1 have previously been determined and stored in memory 130, column spare memory 130 is addressed at its "bank 1" address, and the defective bit column information ("2" and "6" in the example) is applied to control multiplexers 106 and 120. However, only multiplexer 120 receives data bits at its input, and no signal arrives at the input of multiplexer 106. Consequently, multiplexer 106 does nothing. Multiplexer 120 operates as described in conjunction with FIG. 4b, to reroute the defective bits applied to the input port over spare bit paths, so that bits 2 and 6 of each data word, which would normally be applied to, and stored in, bit locations 2 and 6 of each word address of memory bank 1, are instead rerouted by spare bit paths $S_1$ and $S_2$ to column spare locations M and M−1, respectively, of memory bank 1. When station $14_1$ addresses memory bank 1 by way of controlled interface unit $104_1$ for reading data therefrom, memory 130 is addressed, and again applies the defective bit column information to multiplexers 106 and 120, to configure them for sparing bits 2 and 6. Consequently, when memory bank 1 responds with the data from the addressed location, including the correct bit 2 and bit 6 information previously stored at spare bit column locations M and M−1, multiplexer 106 remaps the spare bits to the bit 2 and bit 6 locations of the spared data, as described in detail in conjunction with FIG. 4b. Thus, information is stored in memory bank 1, with spare bit columns M and M−1 being used to store the bits which would otherwise be applied to defective bit columns 2 and 6, and the stored information is put back in the correct order when retrieved.

Control unit 8 transfers column sparing information which may have been determined by a particular interface unit to the corresponding portions of memories 130 of all the other controlled interface units 104. Thus, all controlled interface units 104 of FIG. 6 are loaded with the same bit column sparing information. Thus, any other station 104, such as station $104_L$, which communicates with memory bank 1 to write or read data, spares the same bits, so that the communication system operates without corrupting when reading to memory or writing from memory, from different locations.

If station $14_1$ of FIG. 6 wishes to write to, or read from, memory bank 2, memory 130 of controlled interface unit $104_1$ is addressed at its "bank 2" address, and it responds with the digits 4 and 9, corresponding to defective bit columns 4 and 9 of memory bank 2. The defective bit column information is applied to multiplexers 106 and 120, which spare the corresponding bits of the data transmitted to memory bank 2 for storage therein, or read therefrom. Similarly, transmissions between station $14_1$ and memory banks 3 and I result in sparing bits 2, 7 and X, Y, respectively. Thus, two spare bit columns per memory bank can provide sufficient additional memory to provide uncorrupted data in the presence of two defective data bit columns in each memory.

In general, whenever the error coding or column sparing configuration of a memory bank is changed, the data stored therein must be flushed and replaced under the new configuration or regime. In the event that one of the memory banks $602_1$–$602_K$ is subject to an additional defective bit column over the two for which spares were allocated, additional spare bit columns can be made available by eliminating the use of advanced, bit-intensive error coding, and substituting error coding requiring fewer bits. If, for example, an additional defective bit column occurs in memory bank 1, the EDAC coding stored therein with each data word before the time the defect occurs will, when read, give notice of the defective bit, and correct the data. When a hard error has been determined or detected and no additional spare bit paths are available, the memory can be flushed of its current data and its EDAC coding, and reloaded with the same data, with parity coding instead of EDAC coding, as described above, with the additional defective data bit rerouted onto one of the bit columns freed for other use by dropping back from EDAC to parity coding. Column spare memory 130 would then require additional storage locations associated with each memory bank $602_X$ in which to store the sparing information permitted by the additional freed paths. It would not even be necessary, in some cases, to have true supernumerary or spare bit columns, so long as it were acceptable to switch to parity coding immediately upon occurrence of a bit column defect.

According to one aspect of the invention, each word transmitted by a station of FIG. 6 for storage in memory is routed to a different one of memories 602. For example, if ten sequential words are transmitted by station $104_1$ through crossbar switch 116 for storage, the first word is directed to memory bank 1, the second word is directed to memory bank 2, the third word is directed to memory bank 3, and so forth, until the tenth word is stored in the tenth memory bank (not illustrated). This in turn means that crossbar switch switches after each word, to redirect the next word, and it also means that the sparing configuration changes after each word. A word_cnt or "bank select" block 132 is illustrated in FIG. 4, which is connected to memory 130. Block 132 keeps track of the particular memory bank associated with each word being stored. More particularly, since the number of memory blocks is known, block 132 counts the words transmitted modulo, thereby identifying the memory associated with each word, without the necessity for keeping a log.

As so far described, the memory sparing map is used to reconfigure the column sparing configuration of the multiplexers in the context of memory blocks, to allow continued operation in the presence of multiple errors at each memory location. The "memory" sparing map can be used in the same fashion to dynamically reconfigure the sparing bit path allocation depending upon the stations which are communicating, to allow continued communication in the presence of more than S total system failures of bit paths between stations fitted with station interface units, so long as there are not more than S failures in the bit paths between the communicating stations.

The flow chart of FIGS. 5a, 5b and 5c is generally applicable to the arrangement of FIG. 6, with the understanding that the determination of the presence of errors and the existence of spare bit paths is made on a bank-by-bank (or station-to-station) basis.

Other embodiments of the invention will be apparent to those skilled in the art. In particular, the number of supernumerary bits may be selected as desired. The inventive scheme as described may be used in conjunction with a redundant crossbar switch arrangement which is not collocated with the first multiplex switch arrangement, for an ultra-reliable communications system. While interface units 102 are illustrated as blocks separate from station blocks 12 in FIG. 3, they may be collocated or located in the same block. Switching between EDAC and parity error coding schemes has been described, but switching may be accomplished among three or more coding schemes, as desired, which might be for example, 8-bit EDAC, 2-bit parity, and 1-bit parity. The inventive arrangement may be extended, in certain cases where amplitude-representative data is being communicated, and when additional defects occur after all true supernumerary bits have been allocated, and all the error coding has been dispensed with and the freed-up bit paths allocated, by jettisoning the LSBs of the data signal, and by routing the remaining bits of greater significance through the available bit paths. The reliability of the described communication systems may be enhanced, if desired, by using redundant control blocks 8 and interconnecting buses.

What is claimed is:

1. A system for communicating by the flow of data among a plurality of stations, comprising:
   a plurality of stations, each for transducing digital data in N-bit parallel bit form on an associated data path, where N is a plurality, each bit of a particular significance transduced by any one of said stations being associated with a particular bit path of said associated data path;
   switch means, said switch means including a number, equal to said plurality, of M-bit data ports, where M is a plurality, for switching multibit parallel paths for the flow of data between at least pairs of said data ports of said switch means, any one of said switched multibit parallel paths being subject to failure in the event that one of said bits thereof becomes nontransmissive, each of said multibit parallel paths including said plurality M of bit paths, which plurality M exceeds said plurality N by a number S of supernumerary bit paths, which number S is at least one;
   a plurality of interface units, equal in number to the number of said plurality of stations, each of said interface units being associated with one of said stations and with one of said data ports of said switch means, each of said interface units comprising (a) a plurality N of controllable single-bit (S+1)-to-one multiplexing means, each of said (S+1)-to-one multiplexing means including at least a single-bit first input port, an S-bit second input port, and an output port, for coupling said first input port to said output port in a first control state, and for coupling one bit of said second input port to said output port in a second control state, said first input port of each of said (S+1)-to-one multiplexing means being coupled to one of said N bit paths of said associated one of said data ports of said switch means, said bit paths of said second input port of each of said (S+1)-to-one multiplexing means being coupled to said supernumerary bit paths of said associated one of said data ports of said switch means, and said output port of each of said (S+1)-to-one multiplexing means being coupled to one of said N bit paths of said associated one of said stations, for, in said first control state of said (S+1)-to-one multiplexing means of one of said interface units, coupling information arriving on said one of said N bit paths of said associated one of said data ports of said switch means to a corresponding one of said N bit data paths of said associated one of said stations, and for, in said second control state of said (S+1)-to-one multiplexing means of said one of said interface units, coupling information arriving from said supernumerary bit paths of said M bit paths of said associated one of said data ports of said switch means to one bit path of said N-bit data paths of said associated one of said stations, and (b) an N-bit data path coupled for data flow from said N bit data paths originating at said associated one of said stations to N bits of the associated one of said data ports of said switch means, whereby, in the absence of a failure in any one of said N bits of said switched multibit parallel paths, N bits of data transmitted by said associated one of said stations is coupled over said N bits of said switched multibit parallel paths to a remote one of said stations, but in the presence of a break in one of said N bits of said switched multibit parallel paths, one of said N bits of data transmitted by said associated one of said stations may fail to reach said remote station, resulting in a communication failure, and (c) a plurality S of controllable one-of-many multiplexing means, each of said one-of-many multiplexing means including an N-bit input port and a single-bit output port, each of said bits of said N-bit input port of each of said one-of-many multiplexing means being coupled to one of said N bit data paths originating at said associated one of said stations, and said output port of each of said one-of-many multiplexing means being coupled to one of said supernumerary bit paths of said associated one of said data ports of said switch means, whereby each of said N bits of data transmitted by said associated one of said stations may be coupled by said S one-of-many multiplexing means to any one of said S bits of said associated one of said data ports of said switch means; and control means coupled to said plurality of interface units, for identifying a nontransmissive one of said N bit data paths extending through said switch means between any pair of said stations, for controlling said (S+1)-to-one multiplexing means associated with said nontransmissive bit path to said second state, and for controlling said one-of-many multiplexing means to couple to one of said supernumerary bit paths said one of said bits coupled to its input port which is associated with said nontransmissive bit path.

2. A system according to claim 1, wherein each of said interface units further comprises:

error coding means including an N-bit input port and a C-bit output port, said input port of said error coding means being coupled to receive said N-bit signal from said associated one of said stations, and said output port of said error coding means being coupled to C of said S input ports of each of said plurality S of controllable one-of-many multiplexing means, for generating C-bit error coding signals in response to said N data bits, and for applying said C error coding bits to said controllable one-of-many multiplexing means, whereby said error coding signals may be coupled over C bit paths of said S supernumerary bit paths extending through said switch means to a remote station;

error signal decoding means including an (N+C)-bit input port and an N-bit output port, for receiving N-bit data signals on an N-bit portion of said (N+C)-bit input port from a remote station by way of said plurality N of controllable single-bit (S+1)-to-one multiplexing means, and for receiving a plurality C of error coding signals related to said N-bit data signals on a C-bit portion of said (N+C)-bit input port, for at least detecting the presence of errors in said N-bit data signals, and for coupling N-bit data signals to said output port of said error signal decoding means;

a further plurality C of controllable single-bit (S+1)-to-one multiplexing means, each of said further plurality of controllable (S+1)-to-one multiplexing means including at least a single-bit first input port, an S-bit second input port, and an output port, for coupling said first input port to said output port in said first control state, and for coupling one bit of said second input port to said output port in said second control state, said first port of each of said further plurality C of (S+1)-to-one multiplexing means being coupled to one of C of said supernumerary bit paths of said associated one of said data ports of said switch means, said bit paths of said second input port of each of said C (S+1)-to-one multiplexing means being coupled to said S supernumerary bit paths of said associated one of said data ports of said switch means, for, in said first control state of said further (S+1)-to-one multiplexing means, coupling bits arriving on said one of said C supernumerary bit paths of said associated one of said data ports of said switch means to a corresponding one of said C-bit portions of said (N+C)-bit input port of said error signal decoding means, and for, in said second control state of said (S+1)-to-one multiplexing means of said one of said interface units, coupling information arriving from said supernumerary bit paths of said M bit paths of said associated one of said data ports of said switch means to one bit path of said N-bit portion of said error signal decoding means, whereby said N-bit data signal is coupled to said associated one of said stations.

3. A system according to claim 2, wherein said error signal decoding means includes error correction and detection means for using said error coding signal for correcting errors in said N-bit data signal applied thereto to generate a corrected N-bit data signal, and for applying said corrected N-bit data signal to said output port of said error signal decoding means.

4. A system according to claim 3, wherein said error signal decoding means includes:

parity checking means for detecting errors in said N-bit data signal applied thereto to generate error information;

coupling means for coupling uncorrected N-bit data signal to said output port of said error signal decoding means; and control means for selectively enabling one of said parity checking means and said error detection and correction means.

5. A method for communicating N-bit signals among N-bit stations, comprising the steps of:

applying said N-bit signals from a transmitting station to an N-bit portion of an M-bit switching system including M bit paths extending through said switching system, where M is greater than N by a number S of supernumerary bit paths;

in the event of a failure in one of said N bit paths of said switching system, routing that one bit of particular significance, of said. N bits transmitted by one of said stations, which may, as a result of said failure, arrive at a receiving station as a defective bit, to one of said supernumerary paths extending through said switching system, to thereby form a rerouted bit;

at a receiving station of said communication system, routing all of said N bits received from said N-bit portion of said M bit paths extending through said switching system, except said one bit of said particular significance, to the corresponding bit positions of said N-bit receiving station;

at said receiving station of said communication system, routing said rerouted bit from said supernumerary path extending through said switching system to a bit position corresponding to said particular significance;

generating C error coding bits from said N-bit signal at said transmitting station;

applying said error coding bits from said transmitting station to a C-bit portion of said M-bit switching system, where C is less than S;

in the event of a failure in an additional one of said N bit paths of said switching system, to create an additional defective bit of another significance at a time when a number equal to S−C of said supernumerary bit paths are in use carrying defective bits, reducing the number of said error coding bits to less than C, thereby freeing at least one of said supernumerary bit paths, and routing said additional defective bit to said one of said supernumerary paths freed by said reduction in the number of error coding bits, to thereby form an additional rerouted bit;

at a receiving station of said communication system, routing said additional rerouted bit from said one of said supernumerary bit paths freed by reduction of said error coding to a bit position corresponding to said other significance.

6. A method according to claim 5, further comprising the steps of:

in the event of a failure in a yet further one of said N bit paths of said switching system, to create a yet further defective bit of yet another significance at a time when a number equal to S of said supernumerary bit paths are in use carrying defective bits, reducing the number of said error coding bits to zero, thereby freeing at least one of said supernumerary bit paths, and routing said yet further defective bit to said one of said supernumerary paths freed by said reduction in the number of error coding bits to zero, to thereby form a yet further rerouted bit;

at a receiving station of said communication system, routing said yet further rerouted bit from said one of said supernumerary bit paths freed by reduction of said error coding to zero to a bit position corresponding to said yet further significance.

7. A system according to claim 1, wherein at least some of said stations comprise banks of memory.

* * * * *